T. E. VAUGHN.

RAIL SUPPORT.

APPLICATION FILED SEPT. 1, 1911.

Reissued Oct. 31, 1911. 13,306.

Witnesses:

Chas. A. Becker,

Henry M. Hertel

Inventor:

Thomas E. Vaughn,

By John H. Bruninga,

His Attorney.

UNITED STATES PATENT OFFICE.

THOMAS E. VAUGHN, OF CHICAGO, ILLINOIS, ASSIGNOR TO VAUGHN RAIL SUPPORT CO., OF CHICAGO, ILLINOIS, A CORPORATION OF ILLINOIS.

RAIL-SUPPORT.

13,306. Specification of Reissued Letters Patent. Reissued Oct. 31, 1911.

Original No. 961,917, dated June 21, 1910, Serial No. 426,027. Application for reissue filed September 1, 1911. Serial No. 647,292.

*To all whom it may concern:*

Be it known that I, THOMAS E. VAUGHN, a citizen of the United States, and residing at Chicago, in the State of Illinois, have invented certain new and useful Improvements in Rail-Supports, of which the following is a specification.

My invention relates to improvements in rail supports which are adapted to support railroad rails on their ties.

The objects of my invention are to construct a rail support which will support a rail on and secure it to a tie, and which will be simple in construction, cheap to manufacture, easily applied, and which will protect and preserve the tie.

Figure 2:
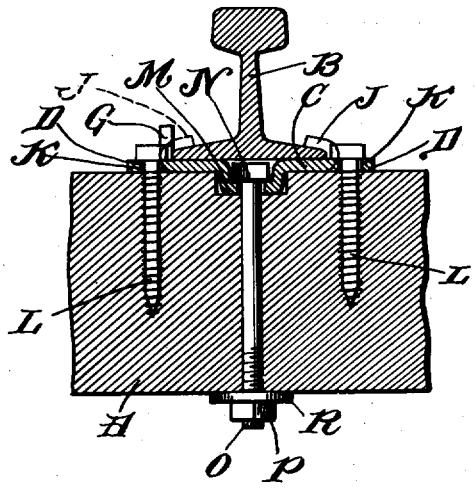
Figure 1:
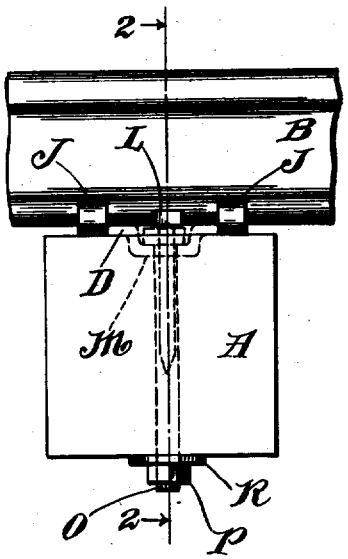
Figure 3:
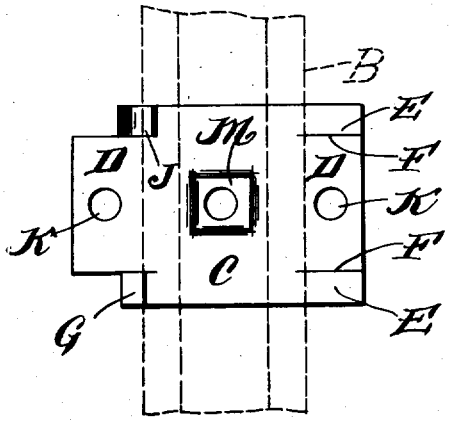
Figure 4:
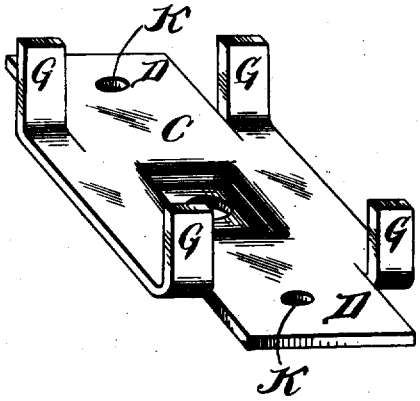

In the accompanying drawings, Figure 1 is a side elevation of the rail and an end view of the tie with parts of my device shown in dotted lines; Fig. 2, is a section on the line 2—2 of Fig. 1; Fig. 3, is a plan view of the plate in process of being formed, and Fig. 4, is a perspective view of the device in its market form ready to be applied to a tie.

Like parts are indicated by the same letter in all the figures.

A is the tie and B the rail.

C is the body of a flat metal plate rectangular in shape which has on both sides wings or projections D, D extending a considerable distance beyond the flange of the rail. In other words, the plate is nearly twice as long as the width of the flange of the rail.

E, E are lips at the corners of the plate formed by slitting the plate at the points F, F. The plate in its market form has each of these lips turned up as indicated at G and as shown in Fig. 4, and when it is applied to the rail these lips are hammered down onto the flange of the rail as indicated at J. The wings on the plate formed by turning up the lips may be perforated at K, K for the lag screws L, or the plate has struck into its lower middle portion the rectangular depression M to receive the rectangular head N of the bolt O which passes through a hole in the tie and is provided with the nut P and washer R beneath the tie. The holes K, K and leg screws L may be used without the central securing means, or in conjunction therewith, or they may be entirely dispensed with. Ties of wood or any other suitable material may be used.

The support in its market form is shown in Fig. 4. The lips are turned up, and as turned up are spaced apart a distance substantially equal to the width of the rail flange. The device is secured to the tie by its fasteners; the ties may be prepared in advance and thus the supports will be spaced apart a proper distance. After the supports are in position the rail is inserted or dropped between the lips from above and the lips are then hammered over the rail flange so as to secure the rail in position. It will be noted that the upwardly extending lips form locating means for locating or positioning the rail on the tie. Since the holes in the tie can be properly and accurately spaced and the supports properly positioned thereon and fastened in advance, the device serves as a track gager and liner.

The plate extends for a considerable distance beyond the flange of the rail over the surface of the tie. Where the depressed central rectangular portion is used it lies in a rectangular recess in the top of the tie. This arrangement minimizes the tendency of the plate to creep along or turn on the tie. The bolt which secures the plate to the tie is placed in a hole directly under the middle of the rail and flange and is thus protected. There will be little tendency for the water to accumulate about the bolt or the tie to rot under the rail. The nut P being placed in the ground immediately rusts so that the parts are locked permanently in position. Where the lag screws are used to fasten the support by its wings, these fasteners will be positioned in the center of the tie so that splitting will be minimized, and the rail flange will be gripped by the lips on both sides of the wings and the fasteners therein. The rail lies between the upwardly projecting lips, and when these lips are bent down on the flange in the position indicated at J, they make a sufficiently tight fit to hold the parts in position and prevent material movement of the rail.

My invention applied serves as a rail holder, a tie plate and a tie preserver. It presents beneath the rail a surface considerably extended along the length of the rail to act as a tie preserver. The plate is extended beyond the rail flange in both directions so as to present a very wide bearing surface on the tie at a point beyond the edge of the flange so as to prevent or minimize the tendency of the plate to embed or bury itself in the tie. It is in effect a lateral extension of the flange to resist the tendency of the rail to tilt or tip. With such an arrangement ties may be more widely spaced than at present, thus reducing the number and cost of ties. Plain fish plates could also be used to make the end connection, angle bars being dispensed with. The material used is preferably basic upon open hearth flange steel.

I claim:

1. A rail support plate comprising a metal plate having pairs of lips turned up from the ends of the plate, the pairs being spaced apart as turned up a distance substantially equal to the width of the rail flange, and lateral projections or wings formed between each pair of lips by turning up said lips, said lateral projections having holes therein to receive fasteners to secure the plate to a tie, said lips being adapted to be turned over the flanges of a rail inserted therebetween.

2. A rail support plate comprising a rectangular metal plate slit at its four corners and having the four corners so slit turned up to form upwardly extending lips, and to form lateral projections or wings between the lips, said projections being perforated to receive fasteners, said lips being adapted to be turned over the rail flanges.

3. As a new article of manufacture, a rail support comprising a metal plate considerably longer than the width of the rail flange and extending laterally beyond the same, provided with lips, spaced by a distance approximately equal to the width of the flange of the rail, upwardly extending, between which the rail can be inserted from above when the plate is in its final position, and adapted to be forced down onto said flange to hold the rail in position, a central depression in the plate under the rail to take into a corresponding recess in the tie, and a bolt beneath the rail with a head lying in such depression and secured at its other end to the tie.

4. As a new article of manufacture, a rail support comprising a metal plate considerably longer than the width of the rail flange and extending laterally beyond the same, provided on each side of the rail with two or more lips, spaced by a distance approximately equal to the width of the flange of the rail, upwardly extending, between which the rail can be inserted from above when the plate is in its final position, and adapted to be forced down onto said flange to hold the rail in position, a central depression in the plate under the rail to take into a corresponding recess in the tie, and a bolt beneath the rail, with a head lying in such depression and secured at its other end to the tie.

In testimony whereof I affix my signature in presence of two witnesses.

THOMAS E. VAUGHN.

Witnesses:

FRANKLIN MILLER,
J. H. BRUNINGA.

Copies of this patent may be obtained for five cents each, by addressing the "Commissioner of Patents, Washington, D. C."